(No Model.)
J. F. KELLY.
ELECTRICAL CONDENSER.
No. 508,887. Patented Nov. 14, 1893.
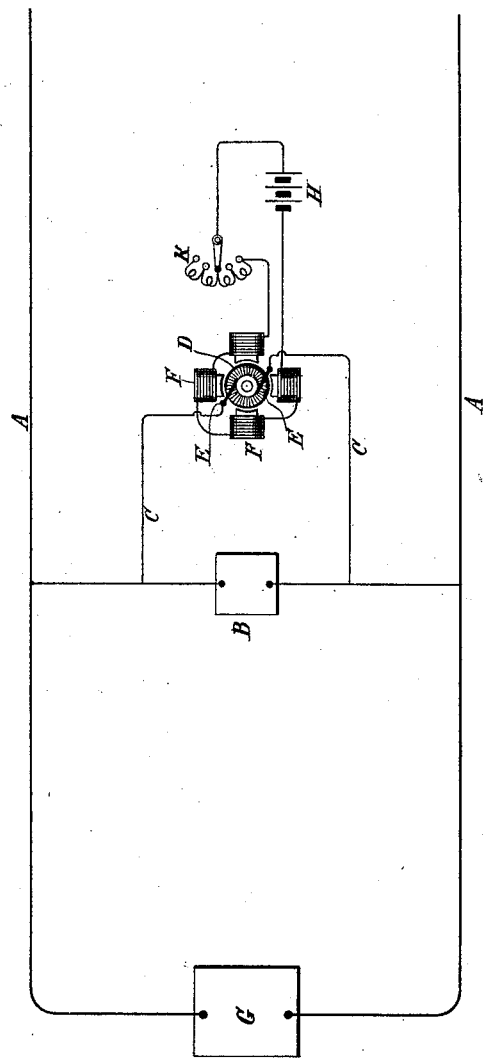
Witnesses
Raphaël Netter
Ernest Hopkinson
Inventor
John F. Kelly
By his Attorneys
Duncan & Page

UNITED STATES PATENT OFFICE.

JOHN F. KELLY, OF PITTSFIELD, MASSACHUSETTS, ASSIGNOR TO THE STANLEY LABORATORY COMPANY, OF SAME PLACE.

ELECTRICAL CONDENSER.

SPECIFICATION forming part of Letters Patent No. 508,887, dated November 14, 1893.

Application filed June 10, 1893. Serial No. 477,189. (No model.)

*To all whom it may concern:*

Be it known that I, JOHN F. KELLY, a citizen of the United States, residing at Pittsfield, in the county of Berkshire and State of Massachusetts, have invented certain new and useful Improvements in Electrical Condensers, of which the following is a specification, reference being had to the drawings accompanying and forming a part of the same.

The main object of my present invention is to provide a substitute for the ordinary forms of condenser in cases when, from the nature of the current employed, the size and cost of the latter would be an objection to its use. The invention, however, while especially useful and advantageous under such circumstances is generally applicable to electrical systems in which it becomes desirable or necessary to neutralize the effects of self-induction in a circuit or circuits of alternating or similar currents. The current that flows through the armature of an alternating current synchronous motor is not only a function of the work to be done by the motor, but also of the excitation of the field. In these motors, it is well known that for a given load, a certain definite excitation of the field will cause the smallest current to flow, and that for any other degree of excitation, either higher or lower, a greater current will be caused to flow, the current leading or lagging behind the impressed electro-motive force as the excitation is higher or lower. It results from this property that if a synchronous motor be running without load, or with no other load than friction, the current which flows through its armature may be pushed greatly in advance of the impressed electro-motive force and its volume made many times that of the energy component by properly increasing the excitation of the field. Under such conditions it will now be evident that the motor acts as and becomes virtually a condenser, and may be used to replace a condenser, in certain cases with great advantage. For example, in a system or circuit where alternating currents of low frequencies and low electro-motive force are used, an ordinary condenser would be cumbersome and much more expensive than a synchronous motor.

Various methods of utilizing and applying the ordinary or electrolytic condensers in such systems are now well-known, and it may be stated in general that my present invention involves broadly the substitution for such forms of the synchronous motor; the requirements of such substitution will be understood from the detailed description which follows, of a specific example.

The drawing represents diagrammatically a portion of a system to which the invention is applied.

A A designate the main conductors of a circuit. B is any translating device, such as a transformer, motor, or other apparatus possessing self-induction, included in a circuit between the main conductors. It will be understood that any number of such devices may be similarly connected with the circuit from the generator G, but a description of one will answer for all. In a shunt C to the translating device is included the armature D of an ordinary synchronous motor, the current being conveyed through the coils of the same by brushes E that bear on collecting rings of the ordinary kind. The field magnet poles of this motor are excited by coils F which are included in or connected with the circuit from a continuous current generator H, which may be a small dynamo machine run in any desired manner, or a primary or a secondary battery. In this circuit is a rheostat or current regulator K, or any other proper means is employed to vary the excitation of the field.

The operation of the apparatus is as follows: The current flowing through the translating device B is retarded by the self-induction of this latter. The retarded current may be considered as the resultant of two component currents, one coinciding in phase with the impressed electro-motive force, the other at right angles thereto. If now the excitation of the field of the synchronous motor be increased to a given and readily determined degree, its electro-motive force will be ahead of the current in the armature, and such current will have a negative lag with respect to the impressed electro-motive force of the generator. This difference may be pushed to almost ninety degrees. The resistance of the shunt circuit including the armature of the motor, and the character of the latter for any particular case are so adjusted that the current driven through it by the impressed electro-motive force of the generator is equal in magnitude to the lagging component of the main current, but as these two currents are one hundred and eighty degrees apart they will just neutralize one another, with reference to the line and generator.

The application of this device as a substitute for the ordinary condenser, under such other analogous conditions as the latter is used, will now be obvious from the above description.

Without confining myself, therefore, to the special application herein described, what I claim is—

1. The combination with an alternating current electric circuit or system possessing self-induction, of a synchronous motor having its armature connected with the circuit and adapted or adjusted by the excitation of its field to impress an electro-motive force in advance of that of the current in the circuit that will neutralize the lagging component of the current, as set forth.

2. As a substitute for a condenser, a device consisting of a synchronous motor the armature of which is adapted for connection with a circuit, and having its field excited to cause a predetermined negative lag in the current flowing in the armature, as set forth.

3. The combination in an alternating current circuit with a translating device possessing self-induction, of an unloaded synchronous motor, the armature of which is in a shunt circuit to the translating device, and means for increasing the excitation of its field to a degree that will neutralize the lagging component of the current in the circuit, as set forth.

JOHN F. KELLY.

Witnesses:
E. L. FRENCH,
ERNEST B. CASTLE.